United States Patent

[11] 3,563,500

[72] Inventor Hans-Otto Fischer
 Kickenstrasse 44a, Neersen near Dusseldorf, Germany
[21] Appl. No. 769,211
[22] Filed Oct. 21, 1968
[45] Patented Feb. 16, 1971

[54] AEROPLANE, IN PARTICULAR GLIDER WITH PROPELLER AUXILIARY DRIVE
 8 Claims, 5 Drawing Figs.
[52] U.S. Cl. .................................................. 244/65; 244/16
[51] Int. Cl. ..................................................... B64c 11/00
[50] Field of Search ........................................ 244/62, 65, 67; 230/240, 250, 252, 120

[56] References Cited
UNITED STATES PATENTS
2,348792  5/1944  Dornier ........................ 244/62
2,558,501  6/1951  Turner .......................... 244/67
3,143,283  8/1964  Downs ......................... 230/121

Primary Examiner—George E. A. Halvosa
Assistant Examiner—James E. Pittenger
Attorney—Ernest G. Montague ABSTRACT: An airplane, in particular a glider which comprises an extended fuselage of circular cross section and a propeller disposed in the fuselage and rotating as an auxiliary drive about the longitudinal axis of the fuselage. The latter is crosswise divided in its center to form two fuselage parts. Planking sheets are provided which have an elongation and longitudinal carriers or frames, extending in the elongation, are uniformly distributed about the periphery of the fuselage, holding together the two fuselage parts spaced apart from each other to define a space theregetween. Means for rotating the propeller in the space are arranged and the planking sheets forming an inward restriction in front of and behind the propeller.

PATENTED FEB 16 1971 3,563,500
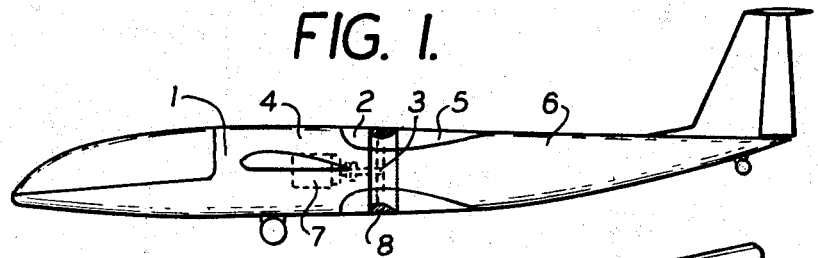
FIG. 1.
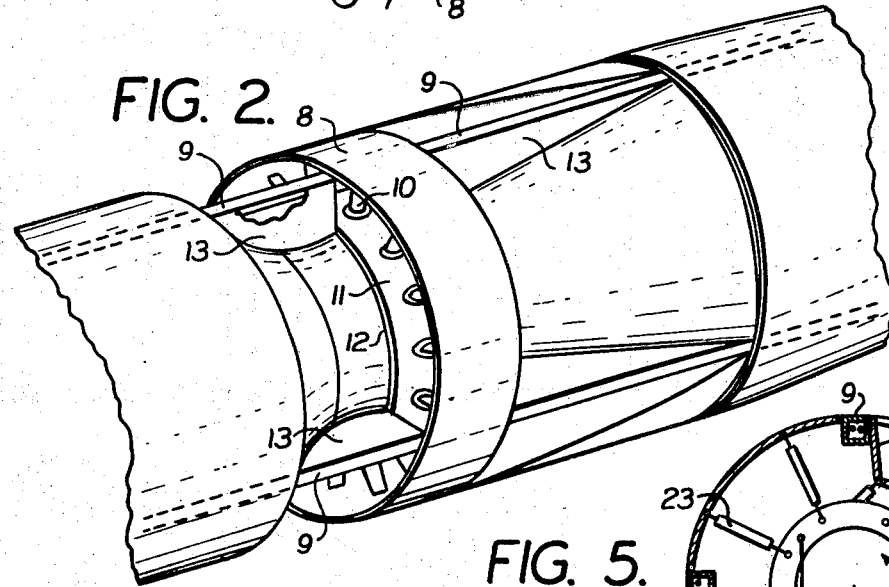
FIG. 2.
FIG. 5.
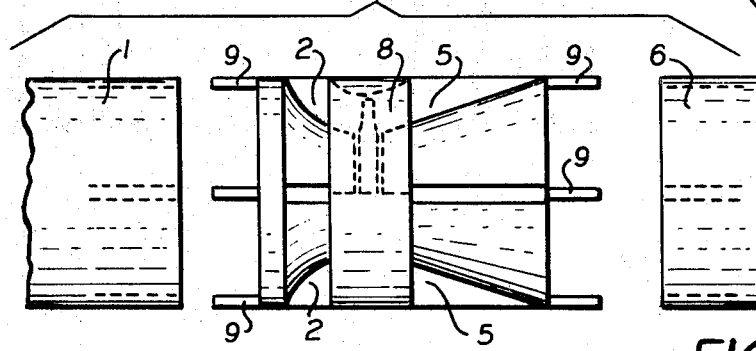
FIG. 3.
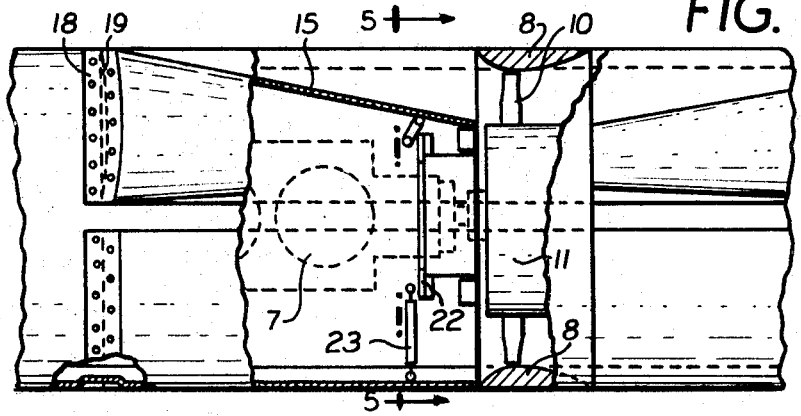
FIG. 4.
INVENTOR
HANS-OTTO FISCHER
BY
ATTORNEY.

AEROPLANE, IN PARTICULAR GLIDER WITH PROPELLER AUXILIARY DRIVE

The present invention relates to an airplane, in general, and to a glider with a propeller auxiliary drive, in particular, and to such airplane with a fuselage of circular cross section and drive by a propeller, whereby the propeller rotates about the longitudinal axis of the circular fuselage.

It has been already proposed to divide a circular fuselage at about its center crosswise to its longitudinal centerline and to connect together the two fuselage parts by means of a carrying structure such by formation of a spacing therebetween, that in the space provided by the spacing formation a rotor serving the drive of the airplane rotates axially to the longitudinal centerline of the fuselage. Pressure nozzles driving the rotor move outside of the elongation of the fuselage about the latter and form the driving motor for a propeller provided on the fuselage lug. Since the rotor projects outwardly from the elongation of the fuselage planking and, thus, projects into the boundary layer stream, the connecting members producing a rigid connection between the two fuselage parts must bridge the rotation circle. They form, thus, an appreciable air resistance.

An airplane with an extended fuselage, which is suitable as a glider, should, however, have no propeller at the fuselage lug and should have no projecting parts exposed to an obstacle against an abutment on the fuselage bottom side.

It is one object of the present invention to provide an airplane, in particular a glider, with a propeller drive, wherein a light airplane, in particular a glider with an propeller is designed such, that the propeller is not disposed on the fuselage lug and in addition is particularly effectively designed. The maintenance and possibility of repair should be simplified, and the structural costs should be low by using a simple type of structure.

It is another object of the present invention to provide an airplane, in particular a glider, with a propeller auxiliary drive, wherein a crosswise divided fuselage is applied and in the space between the two fuselage parts a propeller is arranged axially to the longitudinal centerline of the fuselage and the rotary circle of this propeller is kept smaller than the outer diameter of the fuselage at the dividing point resulting from the total elongation.

A propeller which rotates at this point can be effective, however, only then, when within its range in front of and behind the propeller a constriction of the fuselage is provided, so that the boundary layer stream can be gripped by the propeller.

Since one knows from experience that so-called jacket propellers have a particularly good efficiency, the propeller is surrounded by a jacket which is secured to both fuselage parts in a suitable manner, whereby rodlike connecting members (longitudinal frames) of the two fuselage parts extending in the elongation of the fuselage are simultaneously holding members for the propeller jacket and are guided suitably through the hollow designed jacket of droplike cross section.

One believed until now that the members, forming the fuselage constriction, must be adjustable, so that when the propeller is in its nonoperating position in a glider flight, the fuselage constriction can be removed, whereby then the immovable jacket of the propeller forms a part of a continuous circumferential air duct, since its outer faces extend approximately in the elongation of the fuselage.

The adjustment of the fuselage planking within the range of the propeller is, however, comparatively difficult, since the adjustment movements must be performed during the flight, and the planking sheets must be secured thereby against undesirable fluttering.

The arrangement of radially settable planking sheets, is provided such, that a fuselage constriction is brought about or removed again. Tests have been made, therefore, with a crosswise divided circular airplane fuselage, and a propeller rotating in a sufficiently wide dividing split, whereby, however, the planking sheets are rigidly built in, that means, they are immovably secured to a frame system of the fuselage. It has been shown thereby that in case of a continuous circumferential air duct of predetermined design, no disturbance of the stream, in particular in a glider flight, occurs.

It is yet another object of the present invention to provide an airplane, in particular a glider with a propeller drive, wherein the propeller has the design of a turbine wheel, whereby also substantially only the ends of the propeller blades, pointing towards the propeller jacket, become effective and whereby the number of these blades is relatively great.

It has been shown that the arrangement of a turbinelike propeller brings about extremely favorable stream conditions, in particular if the propeller is formed as a jacket propeller and the jacket forms an integral part of the fuselage.

The rigid connection of the total fuselage is secured such, that rodlike connecting members extend nearly straight in longitudinal direction of the fuselage below the planking sheets and simultaneously form carrying members of the propeller jacket.

In the airplane designed in accordance with the present invention, the fuselage is crosswise divided at about half length at its thickest point and the two fuselage parts are connected together to a rigidly connected unit by forming a spacing sufficient for the propeller with approximately straight running longitudinal carriers, which carry simultaneously the planking sheets. Both fuselage halves are drawn inwardly in front of and behind the propeller in the sense of a continuous circumferential air duct, and the propeller is formed as a jacket propeller, whereby the outer face of the jacket runs along the elongation of the fuselage. The jacket is secured to the longitudinal carriers bridging the restriction.

The hub portion of the propeller is equipped with a relatively wide ring of sheet metal secured to the propeller blades, whereby the edges of this ring continue in front of and behind the propeller nearly without a split into the planking sheets within the range of the continuous circumferential air duct.

The continuous circumferential air duct is, however, formed differently in front of the propeller than behind the propeller, namely such, that on the incoming side the fuselage is set off steplike with directly following strongly curved incoming curve, and on the runout side, that means behind the propeller, the constriction is designed without any steps such, that the sheets within the range of the continuous circumferential air duct follow slowly the elongated part of the fuselage of the rear fuselage part.

An airplane designed in such manner, particularly a glider, with a rigid fuselage planking within the range of the continuous circumferential air duct is appreciably more economical in its production than airplanes with an adjustable fuselage planking with the range of the continuous circumferential air duct. The propeller jacket forms a part of the fuselage and participates thus with the carrying connection of the fuselage. It improves appreciably simultaneously during the flight with operating motor the efficiency of the propeller.

The driving motor can, in this embodiment, be provided, in particularly favorable manner, at the gravity center of the airplane inside of the front fuselage part and the propeller sits directly on the motor shaft, so that particular bearing- and power-transmitting members are not required. Also the maintenance is thereby essentially simplified.

The cooling of a motor disposed inside of the fuselage is likewise simplified. One can take the cooling air from the stem in the fuselage lug.

In the airplane designed in accordance with the present invention, the blade feet of the propeller can be formed inside of the mentioned sheet metal ring surrounding the propeller hub as a blowing wheel and thereby as a means for blowing the cooling air stream, thus, for suction and for pressing the cooling air. The rotating sheet metal ring, which surrounds the hub of the propeller in radial direction at a distance therefrom can have a slightly greater diameter in the rear range and, thereby, keep open an annular split between the adjacent rigid planking sheets, so that the warmed up cooling air emerges from this annular split and is admixed to the passing boundary layer stream.

With these and other objects in view which will become apparent in the following detailed description, the present invention, which is shown by example only, will be clearly understood in connection with the accompanying drawings, in which:

FIG. 1 is a side elevation of a glider with a propeller drive including a fuselage continuous circumferential air duct and with a duct propeller disposed within the range of the constriction;

FIG. 2 is a fragmentary perspective view of the part of the fuselage continuous circumferential air duct a propeller jacket, using a turbinelike propeller;

FIG. 3 is an exploded side elevation of the fuselage part with the ducted propeller as a single unit for purpose of simple repair;

FIG. 4 is a side elevation partly in section of the center part of the fuselage, the planking sheets being shown radially retractable in an adjustable continuous circumferential air duct within the range of the propeller circle and again radially outwardly settable into the elongated face of the fuselage; and FIG. 5 is a section along the lines 5-5 of FIG. 4.

Referring now to the drawings, the fuselage 1 of the airplane is equipped with a continuous circumferential air duct within the range of the propeller. The continuous circumferential air duct 2 in front of the propeller 3 forms a step 4, while the rearwardly disposed part 5 connects the rear fuselage part 6 slowly without forming a step. The propeller 3 sits directly on the shaft of the motor 7 in the forward part of the fuselage, shown in dotted lines, and rotates exactly axially about the longitudinal centerline of the fuselage. The propeller jacket 8 extends in the elongation of the circular fuselage 1. This propeller jacket 8 is secured to longitudinal carriers 9, which connect the two fuselage parts equally distributed about the periphery of the fuselage by forming a spacing between the fuselage parts, so that a unitary rigidity connection of the total fuselage is created. The propeller 3 which rotates within the jacket 8 has a plurality of turbinelike blades or power faces 10. The propeller 8 is equipped towards the hub with a rotating ring 11 of metal, which is secured to the blade feet of the propeller. This ring 11 is designed of such width that it attaches nearly without a split in front of and behind the propeller to the inwardly drawn edges of the planking sheets 12. The longitudinal stiffening members 9 in front of and behind the propeller are covered on both sides with sheets 13, so that the passing boundary layer is guided in longitudinal direction of the fuselage and loses the twist caused by the propeller.

Referring now to FIG. 3 of the drawings, it will be apparent that the longitudinal carriers 9 have separating members, so that the median fuselage part receiving the propeller 3 with the jacket 8 can be disassembled as a single repair unit. The profiled longitudinal carriers or longitudinal frames 9 are inserted at the separating points fittingly into each other and are rigidly connected by means of cross bolts.

The guidance of the cool air for the driving motor disposed inside of the fuselage for the propeller is improved in a simple manner by an arrangement, according to which the cooling air stream is blown by forming the propeller adjacent the hub within the ring 11 as a blow wheel and which air stream is blown through the rear slightly enlarged annular split between the ring and the planking.

The fuselage part containing the propeller with the jacket and the propeller hub is removable as structural repair unit together with the planking sheets which form the constriction. For this purpose, the longitudinal frames carrying the jacket have separating members. In this manner, the front fuselage part and the rear fuselage part can be built together.

Referring now again to the drawings, and in particular to the embodiment of FIG. 4, the continuous circumferential air duct part of the planking sheets disposed in the direction of the flow in front of the propeller is four times divided in accordance with the number of the longitudinal connecting members 9. Each individual segment member of the inwardly adjustable planking sheets is again three times divided in longitudinal direction into two equal side parts 14 and a center part 15. These sheet parts are pivotally connected together by means of band hinges, so-called piano-hinges, at the points 16 and 17.

The two outer sheet parts 14 are mirror imagelike and run pointedly to the edge of the fixed planking. These points of the two sheet parts 14 cover each other in hinges 19 consisting of about wide rubberbands 18. Since the hinge axis is curved, the sheets can be inclined only if thereby the rubberband 18 is correspondingly distorted within the range of each axis.

The edges of the lateral sheets 14 remote from the center sheet 15 are pivotally attached at the points 20 and 21 with band hinges to the longitudinal connecting members 9 in the elongated face.

By rotation of the setting ring 22 which surrounds the motor or the transmission of the motor, the connecting arms 23 are laterally displaced. These connecting arms are attached with one end to the mentioned setting ring and with the other end to the hinge pivot points 16 and 17 of the inwardly movable and again outwardly adjustable planking sheets. During rotation of the ring 22, the medium sheet 15 is moved inwardly out of the elongated face 24 until the curved sheet has nearly splitless attachment to the propeller hub ring 11.

The jacket 8 of the propeller has such profile, also in this embodiment, that it narrows down nozzlelike in the direction towards the propeller circle, while the outer face of the jacket extends approximately straight in the direction of the outer planking, thus, of the fuselage elongation. The jacket 8 of the propeller is suitably hollow and the longitudinal connecting members 9 which retain the latter, are projected through the hollow space of the jacket 8 and welded together with the latter.

The ring 22 can be adjusted from the pilot seat of the airplane. The constriction of the fuselage takes place when the driving motor for the propeller is to be put into operation.

If the airplane finds use as a glider with nonoperating propeller, then in this embodiment the constricted planking sheets can be again adjusted outwardly for the purpose of removal of the constriction. In this case, it is not necessary to provide an adjustment propeller, that means a propeller with adjustable blades, which are swingable, for instance, into glider position.

In the embodiment disclosed in FIGS. 1—3, however, the application of the propeller adjustable during operation as a glider in a glider-flying position is suitable.

Also in the embodiment of FIG. 4 and FIG. 5 of the drawings, the blade feet of the propeller hub ring 11 are formed as blowing wheel for blowing the required cooling air to the driving motor. The cool air is taken, in known manner, from the stem in the neighborhood of the fuselage lug and pushed out again through the rear ring slot between the rotating propeller ring 11 and the inwardly drawn edges of the planking sheets 15, whereby the curvature of the propeller hub ring 11 coincides exactly with the curvature of the median planking sheet part 15.

I claim:

1. An airplane, in particular a glider, comprising:
   an extended fuselage of circular cross section;
   a single propulsion means disposed in said fuselage and rotating about the longitudinal axis of said fuselage;
   said fuselage being crosswise divided in its center to form two fuselage parts;
   elongated planking sheets;
   longitudinal carriers or frames extending outside of said planking sheets, uniformly distributed about the periphery of said fuselage, holding together said two fuselage parts spaced apart from each other to define a space therebetween;
   means for rotating said propulsion means in said space;

said propulsion means comprising a ducted propeller including an outer stationary jacket having a streamlined cross section;

said jacket being secured to said longitudinal carriers, so that said jacket forms an integrating part of said fuselage; and said planking sheets and said ducted propeller forming a continuous circumferential air duct.

2. The airplane, as set forth in claim 1, wherein:

said ducted propeller is formed like a turbine and is equipped with a plurality of blades; and said ducted propeller has a hub portion including an annular ring.

3. The airplane, as set forth in claim 1, wherein:

the range of said continuous circumferential air duct of said fuselage is shorter on the inlet side of the boundary layer in front of said ducted propeller;

said planking sheets of the front part of said fuselage is set off at the start of said continuous circumferential air duct; and said sheets are stepless in said range of said continuous circumferential air duct behind said ducted propeller.

4. The airplane, as set forth in claim 3, wherein the center portion of said fuselage having said continuous circumferential air duct with said duct propeller and said jacket surrounding the latter, is removably connected with the front portion and with the rear portion of said fuselage as a structural unit.

5. The airplane, as set forth in claim 4, wherein:

said duct propeller has blade feet connected with said ring; and said blade feet are formed adjacent said hub as a blow wheel for blowing a cool air stream, in order to cool a driving motor disposed inside of said fuselage, said driving motor constituting said means for rotating said propeller.

6. The airplane, as set forth in claim 5, wherein:

said planking sheets comprise curved metal bodies, pivotally connected with said two fuselage parts, multiply divided in longitudinal direction and radially adjustable within the range of the continuous circumferential air duct; and said curved metal bodies are settable from their position forming the continuous circumferential air duct into the elongated position corresponding with the contour of said fuselage with nearly splitless attachment of said metal bodies to the front edge of said ring or to the front edge and the rear edge of said jacket.

7. The airplane, as set forth in claim 6, which includes:

connecting arms connected with said settable metal bodies at the settable edges of the latter; and rotatably moving setting members pivotally attached to said connecting arms.

8. The airplane, as set forth in claim 7, wherein each individual and outwardly settable metal body is twice pivotally divided between two longitudinal frames, such that said sheets pointing to said longitudinal carriers have the shape of an acute triangle and rigidly pivotally attached to the sides of said longitudinal carriers, such, that said sheets attached to said longitudinal carriers during the inward movement of the median sheet engage laterally said longitudinal carriers and said median sheet is attached without a split in its inward position to the edge of said ring, while said median sheet forms with said side sheets jointly the planking sheets between said longitudinal carriers.